United States Patent Office 3,473,320
Patented Oct. 21, 1969

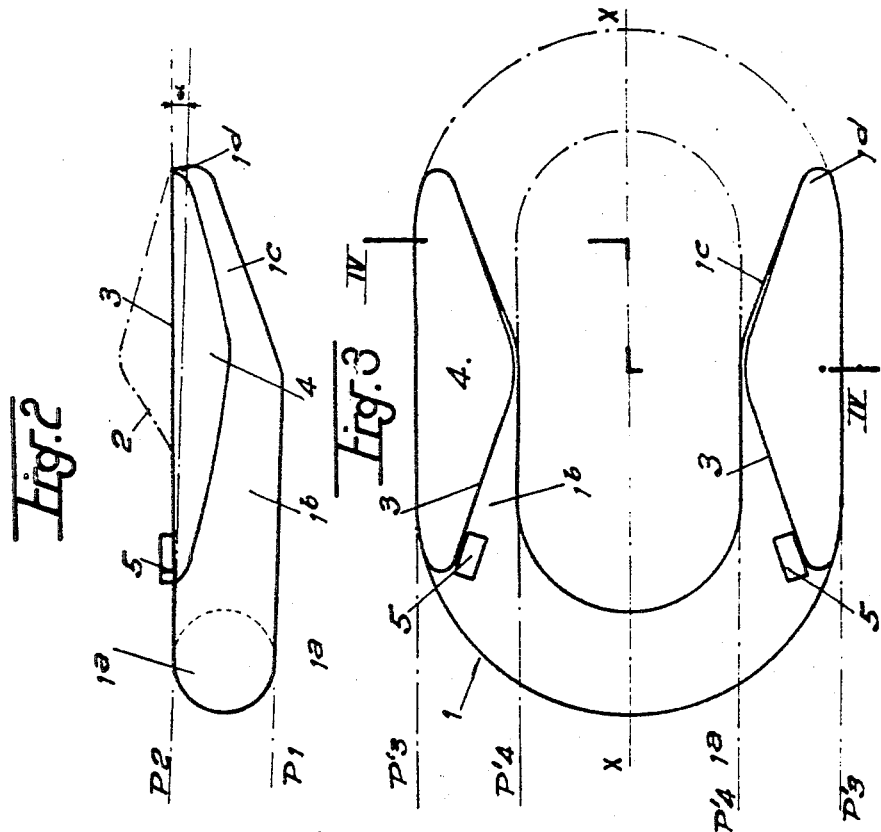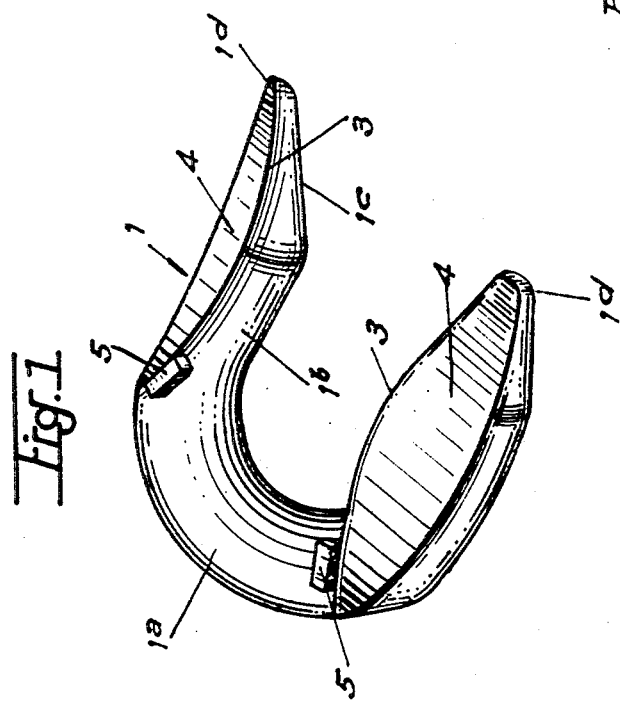

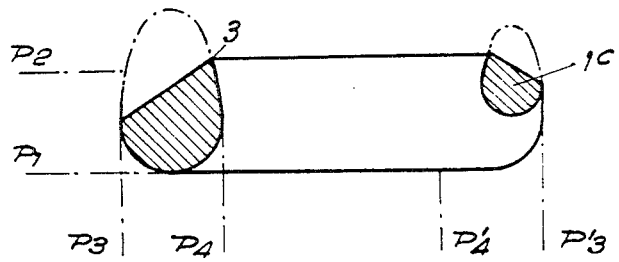
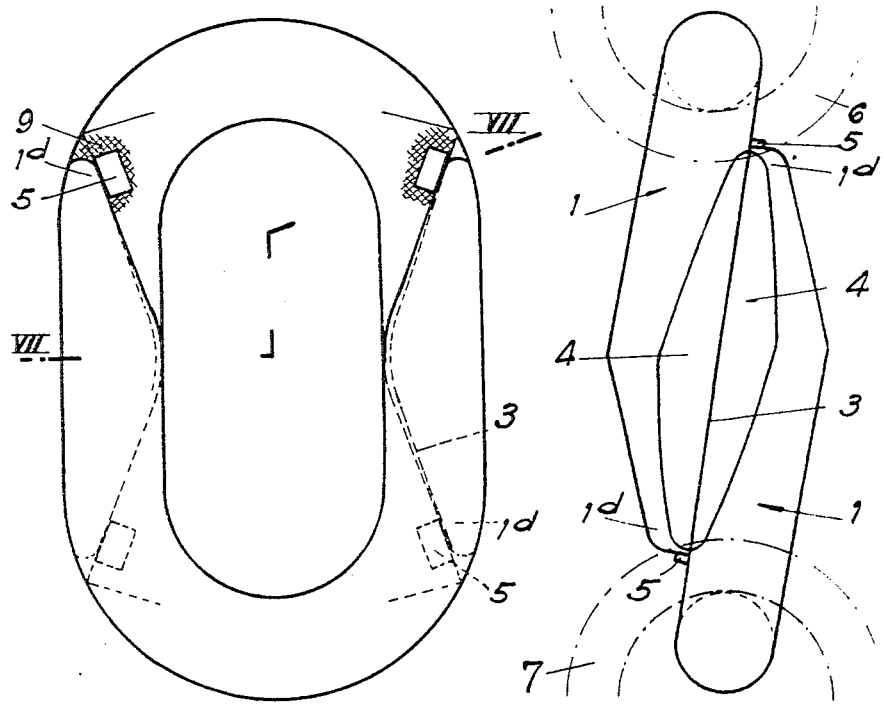
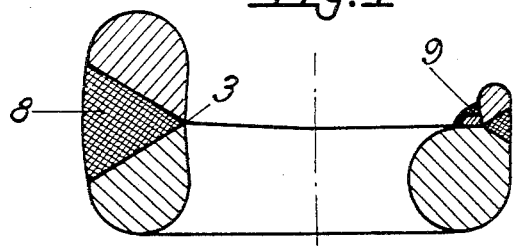

3,473,320
SHACKLE FOR COUPLING A CHAIN TO A TERMINAL RING OR HOOK
Jean Francois Archer, La Celle-Saint-Cloud, France, assignor to Ste Anonyme dite: STAS Societe Technique d'Accessoires Specialises, Asnieres, Hauts-de-Seine, France
Filed Nov. 28, 1967, Ser. No. 686,217
Claims priority, application France, Jan. 12, 1967, 3,328
Int. Cl. F16g *13/06, 13/08*
U.S. Cl. 59—87    6 Claims

ABSTRACT OF THE DISCLOSURE

A shackle for coupling a chain to a terminal ring or hook, made in two U-shaped elements. The legs of each U are shaped and tapered so that they may be overlapped and welded along the length of the legs to form a link, the welds being such that they carry only sheer forces.

---

The ends of metal chains or slings often terminate in rings or hooks to which they are connected by shackles. The latter, which are of a similar shape to a chain link, but of larger dimensions, are formed at present from a metal rod which is partially shaped and then passed through the last link of the chain and the ring or hook, after which the shackle is closed and its two ends are welded together on an anvil. A shackle can also be used for connecting together two portions of chain.

The construction of a shackle of this type is a skilled job and requires experienced personnel. Moreover, the welding of these shackles constitutes a weak point in the chain so that there is no object in making the shackles of high quality steel since it is difficult to obtain forged welds of high strength.

The present invention concerns, as a new industrial product, a shackle for chains or slings which overcomes the disadvantages of the above-mentioned shackles.

The shackle of the present invention is formed from two elements each of which has a substantially U-shape and each leg of which has a curved surface, the concave part of which is turned outwardly and the inner contour of which is a symmetrical curve in a plane substantially tangential to the upper surface of the elements the centre portion of this curve being near the inner contour of this element whilst its ends are near the outer contour of the said element.

To connect the end of a chain or sling to a ring, a hook or another chain, it is only necessary to slip the two elements of the shackle respectively in the last link of the chain and in the said member to be joined thereto, whereupon these two elements are placed one upon the other, end to end, so that they are in contact by the directrices of their curved surfaces, and to fill the two spaces then existing between the curved surfaces with welding material.

In a preferred embodiment of the invention, each shackle element carries abutments which are in contact with the ends of the other elements when the two are in the correct relative position.

The invention also concerns chains or slings, the ends of which terminate in rings, hooks or the like, the latter being connected to the chain or sling by shackles of the above-defined type.

An embodiment of the shackle of the present invention is described hereinafter, with reference to the attached drawings in which:

FIG. 1 is a perspective view of an element of the shackle;
FIG. 2 is a side elevation;
FIG. 3 is a plan view;
FIG. 4 is a section taken on the line IV—IV of FIG. 3;
FIG. 5 is a plan view of the shackle;
FIG. 6 is a side elevation;
FIG. 7 is a section taken on the line VII—VII of FIG. 5.

As shown in the drawings, the shackle is formed of two elements 1 each of which has substantially a U-shape.

Each element 1 is of the form shown in the drawings, FIG. 1. In order that its shape may be clearly understood, the manner in which it is obtained is described below, it being realised that if a prototype is constructed, it is possible to manufacture a die from which the element is then formed.

The element 1 may be considered as constructed from an imaginary U-shaped element comprising a centre portion 1a of circular section which extends over an arc of 120° to 130°, is tangential over its entire length to two parallel planes $P_1$ and $P_2$, and is extended by side portions 1b of oval section. These portions 1b have a width equal to the diameter of the centre portion 1a, but the depth thereof increases from the portion 1a, as shown by the chain-dotted line 2 in FIG. 2, the different sections of the portions 1b being tangential to the plane $P_1$ and to two planes $P_3$ and $P_4$ or $P_3'$ and $P_4'$ which are perpendicular to the planes $P_1$ and $P_2$ and parallel to the transverse centre plane X—X of the element. Between the planes $P_1$, $P_3$ and $P_4$ or $P_1'$, $P_3'$, $P_4'$ the portions 1b have a semi-circular section of the same radius as the sections of the centre part 1a. Each portion 1b is extended by a portion 1c, the width and depth of which continuously decreases from the portion 1b, the different sections of this portion 1c being tangential to the plane $P_3$ or $P_3'$ but continuously separating from the plane $P_1$ and the plane $P_4$ or $P_4'$.

The resultant element is cut along the plane $P_2$ or, better along a plane forming a slight angle $\alpha$ therewith (see FIG. 2): the cutting surface of each side of the element is defined by an external curved line and by an inner curved line 3 having an axis of symmetry disposed at the connection of the portions 1b and 1c: the initial depths of these portions have been determined in such manner as to obtain this symmetry. Then, each side is cut according to a cylindrical surface 4, the generatrices of which rest on the corresponding line 3 and form an angle of substantially 30% with the planes $P_1$ and $P_2$ (see FIG. 4).

The resulting element has branches terminating at the raised points 1d and each having, on its upper face, a cylindrical surface 4, the inner contour of which is formed by a plane line 3 having an axis of symmetry and the ends of which are disposed in the proximity of the plane $P_3$ or $P_3'$ whilst its centre part is in the proximity of the plane $P_4$ or $P_4'$.

An abutment 5 is provided on the upper face of each side of the element 1 at the end of the line 3 opposed to the point 1d, substantially tangentially to this line 3.

After slipping the first member 1 in the end link 6 (FIG. 6) of a chain or sling and a second element 1 in the element 7 to be connected to this chain or sling, these elements are placed on and facing each other so that their centre planes X—X coincide and the points 1d of each element are in contact with the abutments 5 of the other element (FIGS. 5 and 6). Under these conditions, each surface 4 of an element is in contact with the surface 4 of the other element at its contour 3 and over the entire length of this contour.

The resultant shackle has, on each of its sides, an oblong cavity the section of which, at every point of its length, is formed by two straight lines inclined relatively to each other at an angle of 60° (FIG. 7) and it is only necessary to fill this with a weld 8. The resultant assembly is very strong, for the weld extends over the entire thickness of the sides and has an optimum inner angle of 60°. It does not contain a portion perpendicular to the direction of traction which could break in tension. Finally the shape of the cavity takes the maximum quantity of welding material in the minimum space, whilst yet conforming to welding standards.

The assembly may still further be improved by covering the abutments 5 with welding material, as shown at 9 (FIGS. 5 and 7).

We claim:

1. A sackle for chains, comprising of two elements each of which has a substantially U-shape, each leg of said U having a curved surface the concave portion of which is turned outwardly and the inner contour of which is a symmetrical curve disposed in a plane substantially tangential to the upper surface of the element, the centre portion of said curve being near the inner contour of said element when its ends are disposed near the external contour of said element.

2. A shackle as recited in claim 1, wherein each element carries abutments with which the ends of the other element are in contact when the two elements are in their correct relative welding position.

3. A shackle as recited in claim 1, wherein said surface is of regular geometric form.

4. A shackle as recited in claim 3, wherein said curved surface is cylindrical, the generatrix of which forms an angle of the order of 30° with the planes of the upper and lower faces of said element.

5. A shackle as recited in claim 1 wherein the end of each said leg is reduced in thickness and turned up.

6. A chain an end of which terminates in a ring, said ring being connected to said chain by a shackle as recited in claim 1.

References Cited

UNITED STATES PATENTS

| | | | |
|---|---|---|---|
| 240,133 | 4/1881 | Howe | 59—87 |
| 866,151 | 9/1907 | MacRonald | 59—87 |
| 1,358,108 | 11/1920 | Powell | 59—87 |
| 2,079,384 | 5/1937 | Page | 59—87 |
| 2,287,293 | 6/1942 | Clark | 59—87 |

CHARLES W. LANHAM, Primary Examiner

G. P. CROSBY, Assistant Examiner